US012260798B2

(12) United States Patent
Meitl et al.

(10) Patent No.: US 12,260,798 B2
(45) Date of Patent: Mar. 25, 2025

(54) DISPLAYS WITH DISTRIBUTED PIXEL INTERPOLATION

(71) Applicant: X Display Company Technology Limited, Dublin (IE)

(72) Inventors: Matthew Alexander Meitl, Durham, NC (US); Ronald S. Cok, Rochester, NY (US); Lee B. Baker, Raleigh, NC (US); Christopher Andrew Bower, Raleigh, NC (US)

(73) Assignee: X Display Company Technology Limited, Dublin (IE)

( * ) Notice: Subject to any disclaimer, the term of this patent is extended or adjusted under 35 U.S.C. 154(b) by 0 days.

(21) Appl. No.: 17/824,973

(22) Filed: May 26, 2022

(65) Prior Publication Data

US 2022/0392388 A1 Dec. 8, 2022

Related U.S. Application Data

(60) Provisional application No. 63/197,504, filed on Jun. 6, 2021.

(51) Int. Cl.
*G09G 3/20* (2006.01)
*G09G 3/34* (2006.01)

(52) U.S. Cl.
CPC ......... *G09G 3/2003* (2013.01); *G09G 3/3406* (2013.01); *G09G 2320/0666* (2013.01)

(58) Field of Classification Search
None
See application file for complete search history.

(56) References Cited

U.S. PATENT DOCUMENTS

| | | | | |
|---|---|---|---|---|
| 5,550,066 | A | 8/1996 | Tang et al. | |
| 7,622,367 | B1 | 11/2009 | Nuzzo et al. | |
| 8,506,867 | B2 | 8/2013 | Menard | |
| 8,722,458 | B2 | 5/2014 | Rogers et al. | |
| 9,520,537 | B2 | 12/2016 | Bower et al. | |
| 9,930,277 | B2 | 3/2018 | Cok | |
| 9,991,163 | B2 | 6/2018 | Bower et al. | |
| 10,068,548 | B1 * | 9/2018 | Chou | G09G 3/2003 |
| 11,588,075 | B2 | 2/2023 | Bower et al. | |
| 2005/0185836 | A1 * | 8/2005 | Huang | H04N 9/67 382/162 |

(Continued)

*Primary Examiner* — Benjamin C Lee
*Assistant Examiner* — Emily J Frank
(74) *Attorney, Agent, or Firm* — Choate, Hall & Stewart LLP; Michael D. Schmitt

(57) ABSTRACT

An interpolated flat-panel display comprises a display substrate and an array of clusters disposed on the display substrate. Each cluster comprises an exclusive group of display pixels and a cluster controller for controlling the display pixels. The cluster controller is operable to receive input data specifying a desired light output from one or more but fewer than all of the display pixels in the group of display pixels, calculate interpolated data at least in part from the input data, and drive the display pixels to emit light in response to the calculated interpolated data and received input data. The input data can correspond to an image pixel in an input image. The cluster controller can be operable to receive a parameter value describing attributes of a local portion of the input image including the image pixel and the interpolated data is calculated at least in part from the parameter value.

17 Claims, 13 Drawing Sheets

(56) References Cited

U.S. PATENT DOCUMENTS

| | | | | |
|---|---|---|---|---|
| 2010/0309179 | A1* | 12/2010 | Missbach | G09G 3/20 345/205 |
| 2012/0213429 | A1* | 8/2012 | Vasudevan | G06V 30/422 382/176 |
| 2016/0093600 | A1 | 3/2016 | Bower et al. | |
| 2016/0196796 | A1* | 7/2016 | Hara | G09G 3/32 345/690 |
| 2017/0229052 | A1* | 8/2017 | Veernapu | G09G 3/2003 |
| 2019/0273882 | A1* | 9/2019 | Okumura | H04N 5/369 |
| 2020/0312226 | A1* | 10/2020 | Hussell | G09G 3/3413 |
| 2021/0201831 | A1* | 7/2021 | Woo | G09G 3/2074 |
| 2022/0308661 | A1* | 9/2022 | Buckley | G09G 3/2003 |

* cited by examiner

DISPLAYS WITH DISTRIBUTED PIXEL INTERPOLATION

PRIORITY APPLICATION

This application claims the benefit of U.S. Provisional Patent Application Ser. No. 63/197,504, filed on Jun. 6, 2021, the disclosure of which is hereby incorporated by reference herein in its entirety.

CROSS REFERENCE TO RELATED APPLICATIONS

Reference is made to U.S. patent application Ser. No. 17/103,213, filed Nov. 24, 2020, entitled Displays with Interpolated Pixels, the disclosure of which is incorporated herein by reference in its entirety.

TECHNICAL FIELD

The present disclosure relates to (e.g., active-matrix) display architectures with pixel interpolation.

BACKGROUND

Flat-panel displays are widely used in conjunction with computing devices, in portable electronic devices, and for entertainment devices such as televisions. In recent years, flat-panel displays have increased in size and number of display pixels, resulting in data bandwidth challenges for such large flat-panel displays. High data rates are needed to communicate the large amounts of image pixel data necessary to display large, high-resolution images on the flat-panel display. Such data rates can be difficult or expensive to achieve over large display substrates.

Displays are typically controlled with either a passive-matrix (PM) control scheme employing electronic control circuitry external to the display pixel array or an active-matrix (AM) control scheme employing electronic control circuitry on the display substrate controlling the display pixels and associated light-emitting elements. Both OLED displays and LCDs using passive-matrix control and active-matrix control are available.

Active-matrix circuits are commonly constructed with thin-film transistors (TFTs) in a semiconductor layer formed over a display substrate and employing a separate TFT circuit to control each light-emitting pixel in the display. The semiconductor layer is typically amorphous silicon or poly-crystalline silicon and is distributed over the entire flat-panel display substrate. The semiconductor layer is photolithographically processed to form electronic control elements, such as transistors and capacitors. Additional layers, for example patterned insulating dielectric layers and conductive metal layers are provided, often by evaporation or sputtering, and photolithographically patterned to form electrical interconnections, or wires, from the electronic control elements to the light emitting elements in the display pixels or from a display controller external to the display pixel array to the electronic control elements. An example of such an AM OLED display device is disclosed in U.S. Pat. No. 5,550,066.

In some display implementations, small integrated circuits (ICs) with a separate IC substrate disposed on a display substrate control display pixels in an active-matrix display. The integrated circuits can be disposed on the display substrate using micro-transfer printing, for example as taught in U.S. Pat. No. 9,930,277. Some displays comprise micro-light-emitting diodes controlled by micro-pixel controllers to emit light from a display pixel on the display substrate. Because the display components are so small, the display has a small fill factor (aperture ratio) so that other structures or components can be provided on the display, for example as disclosed in U.S. Pat. No. 9,991,163.

Image pixels of an input image are typically loaded into active-matrix displays with row and column controllers (drivers) controlled by the display controller. The row driver is connected to each row of display pixels with a row wire and the column driver is connected to each column of display pixels with a column wire. The row driver selects a row of display pixels with a row select signal on a row wire and the column driver provides image pixels over a column wire connected to each display pixel in the selected row. The row and column drivers sequentially communicate image pixels (e.g., input image pixels) into corresponding sequential rows of display pixels over the column wires. For large-format displays with a large number of display pixels, for example approximately 1k by 2k (e.g., full high-definition or FHD and also referred to as a 2k display), 2k by 4k (referred to as a 4k display), or 4k by 8k (referred to as an 8k display) that display corresponding large images at a high frame rate, the communication bandwidth requirement for the column lines can be difficult to achieve. (As referenced herein, 2k, 4k, and 8k displays do not have to be exactly of the referenced size and can have only approximately, for example within 20%, the number of indicated rows and columns of display pixels.) For example, a column wire can be a few microns wide and a meter or more in length.

For example, a 1k×2k three-color display with 8-bit image pixels operating at a 60 Hz frame rate must load approximately 377 million bytes of data into the display each second. In a conventional active-matrix design, each row of image pixels must be loaded into each display pixel row at the given frame rate, requiring a bandwidth of approximately 1.5 MHz for each column wire over the extent of the display substrate. A 4k by 8k display must load 16 times as much image data every second. Since the row and column wires connected to every display pixel can be relatively small and the display substrate can be relatively large, the resistance of the row wire or, especially, the column wire can limit the bandwidth of the wire and the frame rate and image size supported by the display.

There remains a need for active-matrix display systems that provide improved signal distribution of high bandwidth signals, reduced bandwidth requirements, and high-resolution images over relatively large display substrates.

SUMMARY

The present disclosure includes, among various embodiments, an interpolated flat-panel display, comprising a display substrate and an array of clusters disposed on the display substrate. Each cluster comprises an exclusive group of display pixels and a cluster controller for controlling the display pixels. The cluster controller is operable to (i) receive image pixel input data from an input image specifying a desired output from one or more but fewer than all of the display pixels in the group of display pixels, (i) calculate interpolated data at least in part from the input data, and drive at least one of the display pixels to emit light in response to the calculated interpolated data.

In some embodiments, the cluster controller is operable to drive each of the display pixels in the group of display pixels to emit light individually in response to the interpolated data or the input data. In some embodiments, the cluster controller is operable to drive at least one of the display pixels in the group of display pixels to emit light in response to the interpolated data and to drive at least one of the display pixels in the group of display pixels to emit light in response to the input data.

The input data can correspond to an image pixel in an input image. The cluster controller can be operable to also receive a parameter value describing image attributes of a local portion of the input image including the input data. Using the input data and the parameter value, the cluster controller can calculate interpolation data for the display pixels in the cluster that embodies image attributes of the input image in the local area of the image pixel input data in the input image. In some embodiments, a single parameter value can be provided for each cluster. In some embodiments, display pixels can be full-color display pixels comprising red, green, and blue color channels and the cluster controller can be operable to receive a separate parameter value for each color channel of the red, green, and blue color channels. The parameter values can be digital values having multiple bits and the number of bits in the parameter values for red and blue can be less than the number of bits in the parameter value for green.

According to embodiments of the present disclosure, the image attributes can include texture, brightness, and spatial noise, the parameter values can specify one or more of a frequency, an edge direction, a magnitude, a phase, and noise of the image attributes in the local area of the image pixel in the input image. The specified magnitude can include a sign specifying whether interpolated values are larger or smaller than the received input data. The magnitude can specify a difference for interpolated data from the received input data.

According to embodiments of the present disclosure, clusters can comprise two display pixels, four display pixels, eight display pixels, twelve display pixels, sixteen display pixels, 24 display pixels, 32 display pixels, or 64 display pixels arranged in a one-dimensional array or in a two-dimensional array.

Each display pixel in each cluster can be controlled by a pixel controller and each pixel controller can be controlled by the cluster controller (e.g., each display pixel is controlled by only one cluster controller and no display pixel is controlled by more than one cluster controller).

According to some embodiments, the clusters are disposed in cluster rows and cluster columns and the display pixels are disposed in pixel rows and pixel columns. The number of cluster rows can be less than the number of pixel rows, the number of cluster columns can be less than the number of pixel columns, or both. Thus, the number of image pixels in the input image is less than the number of display pixels in the interpolated flat-panel display. In some embodiments, each cluster is responsive to more than one image pixel (e.g., input data), for example two or four image pixels. The number of cluster rows and cluster columns can correspond to a 2k display and the number of pixel rows and pixel columns can correspond to a 4k display so that the displayed image is upscaled by a factor of two in each of the x and y dimensions of an image display, the number of cluster rows and cluster columns can correspond to a 4k display and the number of pixel rows and pixel columns can correspond to an 8k display so that the displayed image is upscaled by a factor of two in each of the x and y dimensions of an image display, or the number of cluster rows and cluster columns can correspond to a 2k display and the number of pixel rows and pixel columns can correspond to an 8k display so that the displayed image is upscaled by a factor of four in each of the x and y dimensions of an image display.

According to some embodiments, all of the display pixels in the interpolated flat-panel display are full-color display pixels. According to some embodiments, at least one of the display pixels is a monochrome display pixel that emits only green light or only white light. According to some embodiments, the cluster controller drives one display pixel to emit light in response to the input data (e.g., an image pixel) and the remaining display pixels are driven to emit light in response to the interpolated data. According to some embodiments, all of the display pixels in the cluster are driven by the cluster controller to emit light in response to interpolated data calculated from the input data.

According to some embodiments of the present disclosure, the cluster controller is operable to measure an attribute of the cluster's local environment and calculate interpolated data responsive to the measured attribute. A cluster sensor responsive to the attribute of the cluster's local environment can be disposed within the cluster controller or on the display substrate and under the control of the cluster controller. The attribute of the cluster's local environment can be one or more of an electrostatic potential, local capacitance, local temperature, local ambient light intensity, local electromagnetic radiation, and local reflectivity.

In some embodiments, the cluster controller is a microcontroller having instructions stored thereon that, when executed, cause the cluster controller to perform steps (i)-(iii). In some embodiments, the cluster controller is a state machine designed to perform steps (i)-(iii). In some embodiments, the cluster controller comprises firmware that, when executed, performs steps (i)-(iii). In some embodiments, the cluster controller comprises a logic (e.g., a digital logic) operable to perform steps (i)-(iii).

According to some embodiments of the present disclosure, a method of operating a flat-panel display comprises providing an active-matrix display (e.g., an analog or digital active-matrix display) comprising an array of clusters, each cluster comprising a cluster controller for exclusively controlling two or more display pixels, receiving an input image comprising image pixels and computing an image attribute parameter (e.g., parameter) associated with each image pixel, for example with a display controller, transmitting an image pixel and associated image attribute parameter to each cluster with the display controller, row and column controllers, and row and column wires connected to the cluster controllers, using the cluster controllers to calculate interpolation data for one or more display pixels controlled by the cluster controller in each cluster in response to the transmitted image pixel and parameter, and using the cluster controllers to control the display pixels to emit light in response to the interpolated data and image pixel. The image attribute parameter can encode information describing one or more image attributes of a local portion of the input image comprising the image pixel.

Embodiments of the present disclosure provide active-matrix display control architectures and methods that provide display architectures with reduced image pixel data rates and apparently improved resolution over relatively large display substrates. Displays according to embodiments of the present disclosure can appear sharper, use less power, and have a lower bandwidth requirement.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
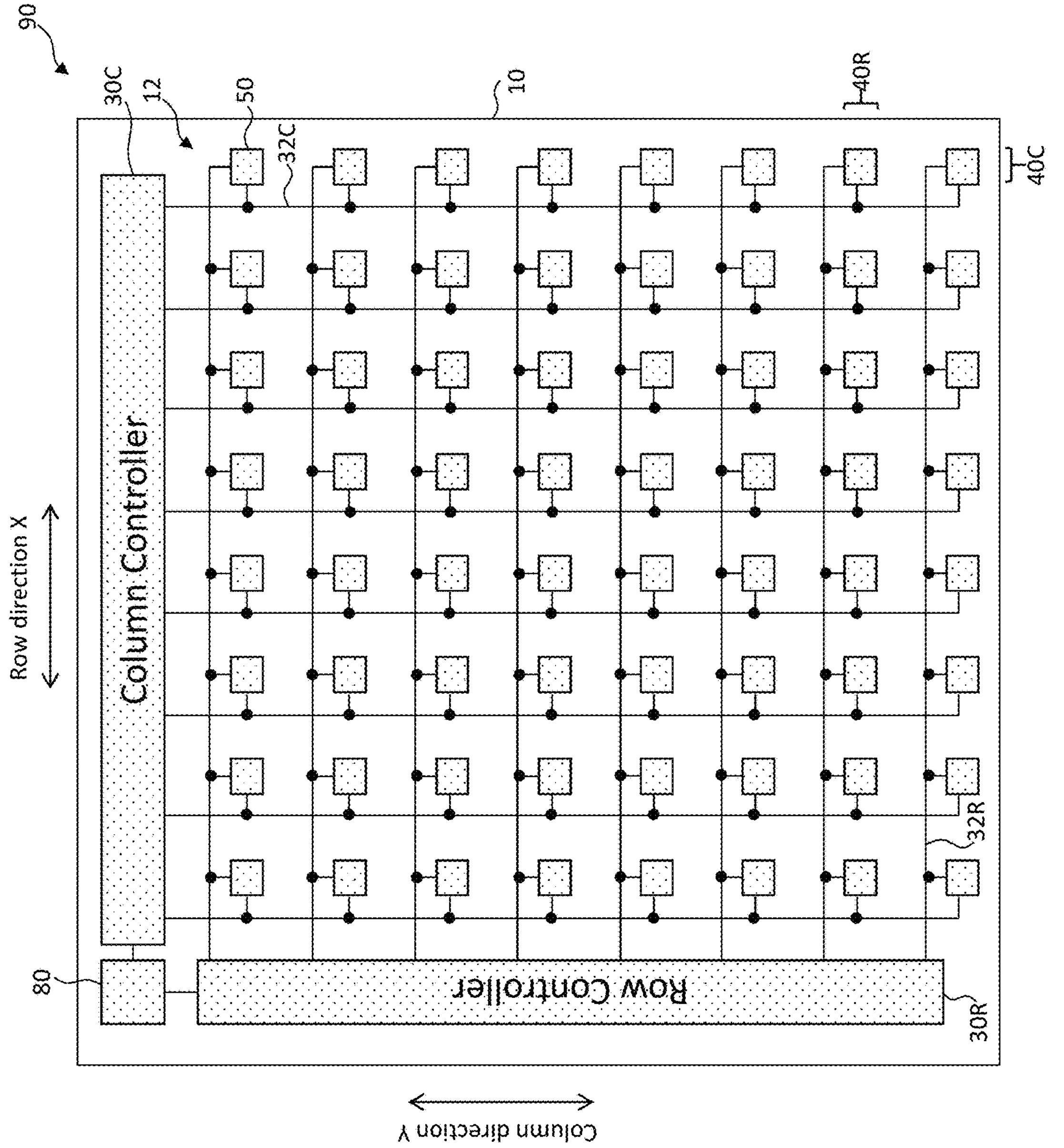
FIG. 1 is a schematic plan view of a display having clusters according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF CERTAIN EMBODIMENTS

Figure 2:
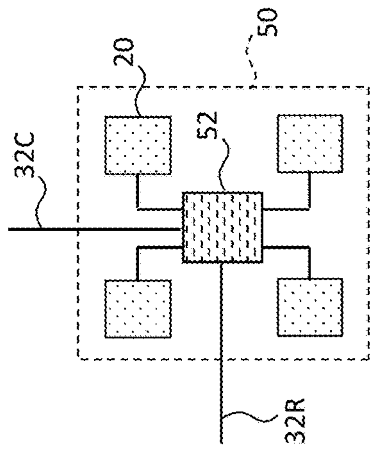
FIG. 2 is a schematic diagram of a cluster comprising four display pixels according to illustrative embodiments of the present disclosure.

Embodiments of the present disclosure provide, inter alia, display control methods, structures, devices, and architectures that enable large-format displays with relatively large numbers of pixels using reduced data rates. As illustrated in FIGS. 1-3, an interpolated flat-panel display 90 can comprise an array 12 of clusters 50 comprising rows 40R and columns 40C of clusters 50 disposed on a display substrate 10. Each cluster 50 can comprise an exclusive group of spatially adjacent display pixels 20. Input image pixels can be loaded into array 12 of pixel clusters 50 by row controller 30R providing row-select signals on row wires 32R to each row 40R of pixel clusters 50 and column controller 30C providing column-data signals to columns 40C of pixel clusters 50 on column wires 32C under the control of a display controller 80.

According to embodiments of the present disclosure, the input image data rate necessary to support a display can be reduced by loading input images with fewer rows or columns, or both, of input image pixels into the display and then using the cluster controller 52 (or other controller disposed in association with an exclusive group of display pixels 20) to compute additional interpolated pixel values displayed by display pixels 20 in interpolated flat-panel display 90. According to embodiments, each interpolated flat-panel display 90 comprises an array 12 of clusters 50 comprising cluster controllers 52 that each exclusively control a cluster of display pixels 20 in cluster 50, for example a two-by-two array of display pixels 20, a four-by-four array of display pixels 20, or an eight-by-eight array of display pixels 20. Cluster controller 52 receives input image pixels for fewer than all of display pixels 20 controlled by cluster 50 and calculates interpolated data 62 for at least some of display pixels 20 in cluster 50 (see FIG. 6, for example). Cluster controllers 52 can control a one-dimensional array of display pixels 20 or a two-dimensional array of display pixels 20. For simplicity and clarity of exposition, exemplary illustrations used herein are two-dimensional and have same number of display pixels 20 in the vertical and horizontal directions, e.g., the orthogonal dimensions of a surface of display substrate 10.

As used herein, an input image is a numeric, two-dimensional array of image pixels (image picture elements) having values specifying a desired luminance for an array of display pixels 20 in a display 90. Display pixels 20 are physical opto-electronic circuits comprising one or more light emitters controlled, for example through wires, by an optional pixel controller disposed on display substrate 10 of display 90 and arranged in clusters 50. Input data 60 are one or more image pixels transmitted from a display controller 80 and received or input by a cluster 50 (see FIG. 6, for example). Interpolated data 62 are values calculated at least in part from input data 60 that specify a desired luminance for one or more of display pixels 20 in each cluster 50.

Figure 3A:
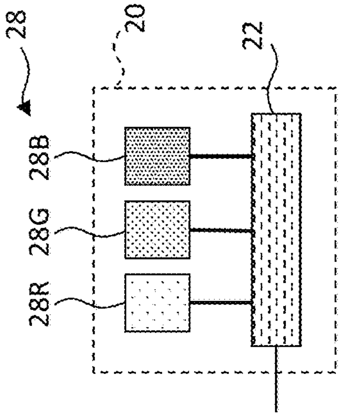
FIG. 3A is a schematic diagram of a full-color display pixel according to illustrative embodiments of the present disclosure.
Figure 3B:
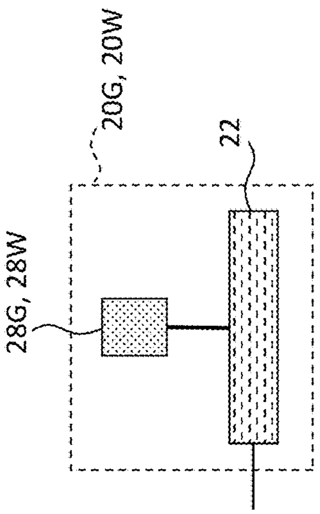
FIG. 3B is a schematic diagram of a monochrome display pixel according to illustrative embodiments of the present disclosure.
Figure 3C:
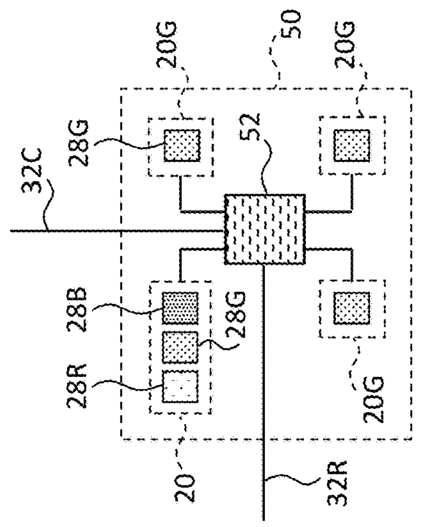
FIG. 3C is a schematic diagram of a cluster comprising a full-color display pixel and monochrome display pixels according to illustrative embodiments of the present disclosure.
Figure 3D:
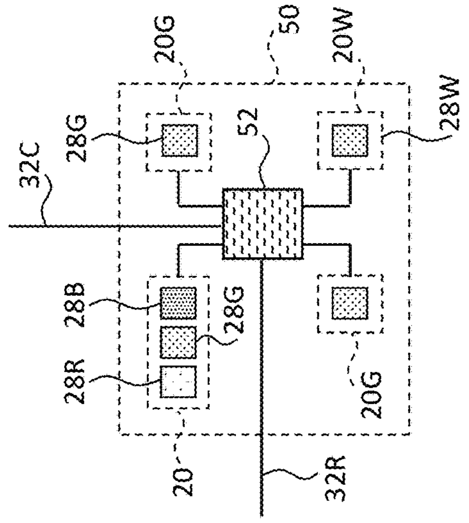
FIG. 3D is a schematic diagram of a cluster comprising a full-color display pixel and green and white monochrome display pixels according to illustrative embodiments of the present disclosure.
Figure 3E:
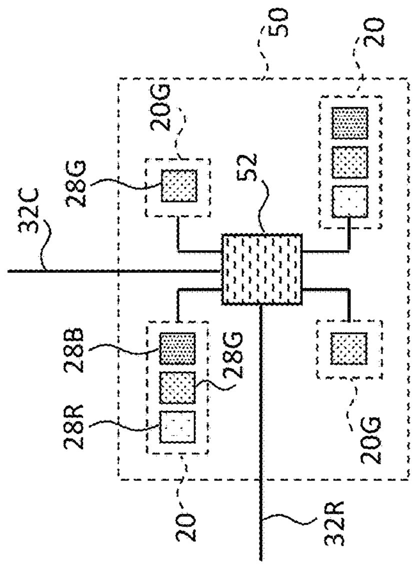
FIG. 3E is a schematic diagram of a cluster comprising two full-color display pixels and two monochrome display pixels according to illustrative embodiments of the present disclosure.

For example, and as shown in FIG. 1, a display 90 can comprise a two-dimensional array 12 of clusters 50 disposed on display substrate 10. Each cluster 50 comprises a cluster controller 52 and, as shown in FIG. 2, each cluster controller 52 controls an exclusive two-dimensional array of display pixels 20. As shown in FIG. 3A, each display pixel 20 can comprise multiple sub-pixels, for example a red sub-pixel for emitting red light, a green sub-pixel for emitting green light, and a blue sub-pixel for emitting blue light. As shown in FIG. 3B, a green display pixel 20G can comprise one sub-pixel 28G for emitting green light or a white display pixel 20W can comprise one white-light-emitting sub-pixel 28W for emitting white light. FIG. 3C illustrates a cluster 50 comprising a single full-color display pixel 20 and three monochrome green display pixels 20G. FIG. 3D illustrates a cluster 50 comprising a single full-color display pixel 20, two monochrome green display pixels 20G, and one monochrome white display pixel 20W. FIG. 3E illustrates cluster 50 comprising two full-color display pixels 20 and two monochrome green display pixels 20G. In some embodiments, FIG. 3E could comprise full-color display pixels 20 and white display pixels 20W or one white display pixel 20W and one green display pixel 20G. Such arrangements can improve apparent spatial resolution or luminance, or both, of clusters 50 and display 90 with fewer light emitters 28.

For example, a 2k-by-4k display can comprise a 1k-by-2k array 12 of cluster controllers 52. Each cluster controller 52 controls a local cluster 50 of display pixels 20, for example a two-by-two array. Row and column wires 32R, 32C are connected to each cluster controller 52 and transmit row-select signals and column-data signals under the control of row and column drivers 30R, 30C, respectively. Row and column drivers 30R, 30C transmit a 1k-by-2k array of image pixels into the 1k-by-2k array 12 of cluster 50. Each cluster controller 52 in each cluster 50 then calculates or otherwise determines input or interpolated data 62 for each display pixel 20 of the two-by-two array of display pixels 20 controlled by cluster controller 52 and drives the corresponding light emitters 28 to emit light in correspondence with the input or interpolated data 62, for example red, green, and blue sub-pixel values in each display pixel 20. Thus, the 2k-by-4k interpolated flat-panel display 90 emits light from a corresponding array of 2k-by-4k display pixels 20 but only a 1k-by-2k array of input image pixels is loaded into the 2k-by-4k interpolated flat-panel display 90, reducing the bandwidth and power requirements for loading input image pixels into display 90 by a factor of four. Similarly, a 4k-by-8k display can comprise a 2k-by-4k array of cluster controllers 52. In other embodiments, a 4k-by-8k interpolated flat-panel display 90 comprises a 1k-by-2k array 12 of clusters 50 and the bandwidth and power requirements for loading input image pixels into the display is reduced by a factor of sixteen.

For simplicity and clarity in understanding, large-format displays 90 of the present disclosure are illustrated as 1k-by-2k (1,024 by 2,048 display pixels 20), 2k-by-4k (2,048 by 4,192 display pixels 20), or 4k-by-8k (4,192 by 8,384 display pixels 20) displays. However, according to embodiments of the present disclosure, large-format interpolated flat-panel displays 90 can have other image pixel array sizes, for example 1920 by 1080 image pixels, according to a manufacturer's design or a display standard (e.g., a high-definition television standard such as Rec. 709).

As illustrated in FIG. 2 and according to embodiments of the present disclosure, clusters 50 of display pixels 20 comprise exclusive groups of locally neighboring display pixels 20 on display substrate 10. Each cluster 50 can comprise a cluster controller 52 responsive to an input image pixel provided by row-select and column-data signals transmitted on row wires 32R and column wires 32C, respectively. Cluster controller 52 can be an integrated circuit, for example a CMOS or a mixed signal circuit that can receive row-select and column-data signals and control display pixels 20 in cluster 50.

As illustrated in FIGS. 3A and 3B, each display pixel 20 comprises one or more light emitters 28, for example inorganic light-emitting diodes (LEDs) or micro-LEDs. In some embodiments, light emitters 28 are organic light-emitting diodes or liquid crystal valves that pass light emitted from a back light. Light emitters 28 can comprise a red LED 28R emitting red light, a green LED 28G emitting green light, and a blue LED 28B emitting blue light (collectively light emitters 28). In some embodiments, display pixels 20 comprise a pixel controller 22 that receives signals from cluster controller 52 to control light emitters 28, as shown in FIGS. 3A, 3B. In some embodiments, display pixels 20 do not comprise a pixel controller 22 and light emitters 28 are controlled directly by cluster controller 52.

Figure 4:
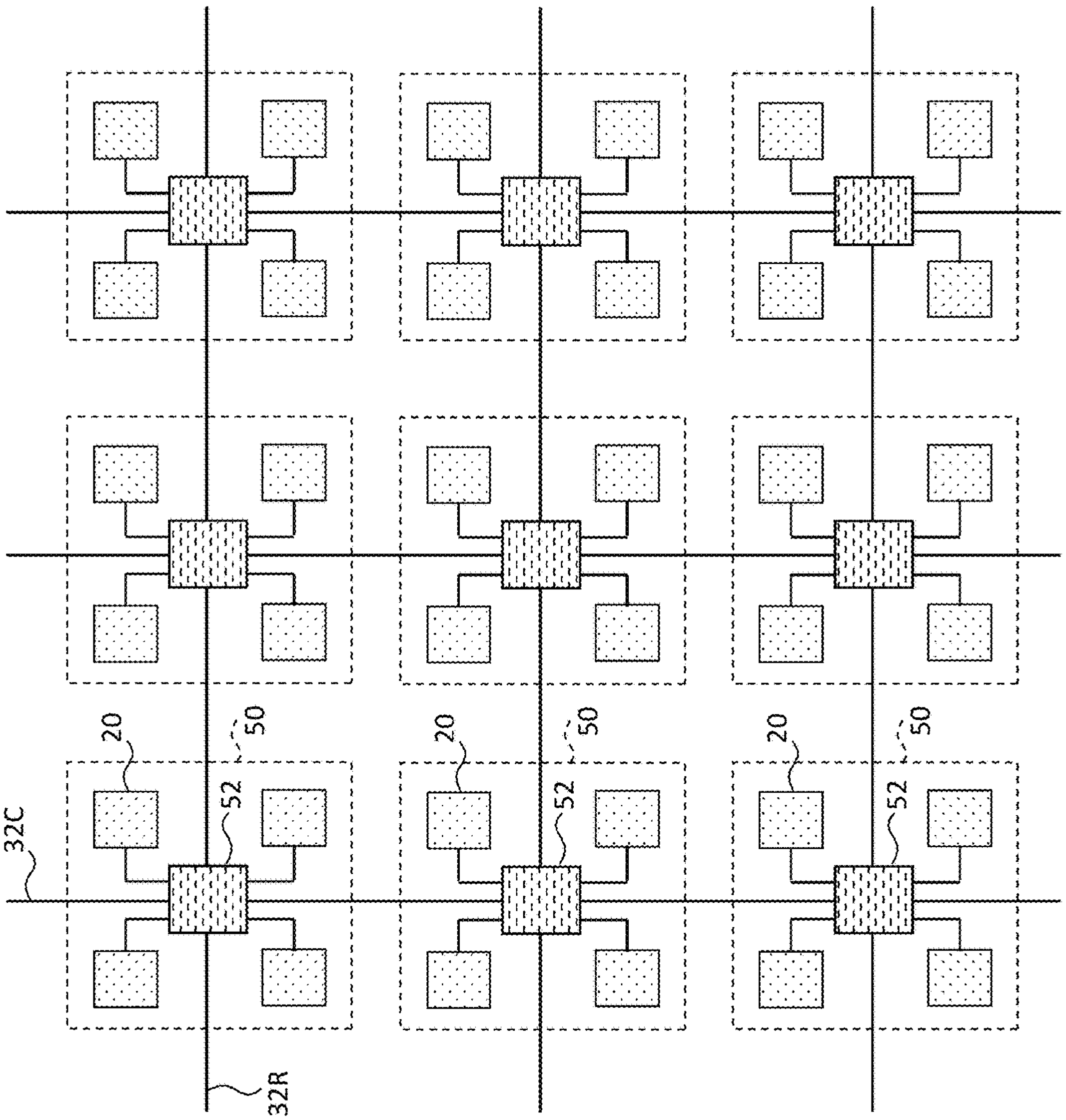
FIG. 4 is a schematic partial plan view of an interpolated flat-panel display according to illustrative embodiments of the present disclosure.

FIG. 2 illustrates a cluster 50 comprising a two-by-two array of display pixels 20. In other embodiments, a cluster 50 can comprise a three-by-three array of display pixels 20, a four-by-four array of display pixels 20, an eight-by-eight array of display pixels 20 or, in general an array of display pixels 20 of any size. The array of display pixels 20 in a cluster 50 can be one-dimensional or two-dimensional and can have equal numbers of display pixels 20 in the x and y dimensions (as shown in FIG. 2), or different numbers of display pixels 20 in the x and y dimensions. Clusters 50 and display pixels 20 can be arranged on display substrate 10 in a spatially regular array 12, as illustrated in FIGS. 1 and 4.

According to embodiments of the present disclosure, each cluster 50 receives image pixels (input data 60) for fewer display pixels 20 than are in cluster 50, reducing the communication bandwidth (and possibly power) required for interpolated flat-panel display 90. Thus, each cluster 50 will calculate (interpolate) luminance values for one or more of display pixels 20 in cluster 50. For example, and corresponding to FIGS. 1-4, an interpolated flat-panel display 90 can have 4k columns of display pixels 20 and 2k rows of display pixels 20 in a 4k-by-2k display (referred to as a 4k display) and receive 2k columns and 1k rows of input image pixels that are each transmitted to a spatially corresponding cluster 50 in interpolated flat-panel display 90. Cluster controller 52 in each cluster 50 then calculates luminance values for each display pixel 20 in cluster 50. In the FIG. 4 example, the result will be an upscaled image (from a 2k input image to a 4k displayed image) with interpolated data 62. Similarly, a 4k input image data array can be upscaled to an 8k pixel display. If each cluster 50 controls a four-by-four array of display pixels 20, a 2k input image can be upscaled to an 8k displayed image. Thus, each cluster 50 receives a single image pixel (input data 60) but drives multiple display pixels 20 (e.g., a two-by-two array of display pixels 20 or a four-by-four array of display pixels 20 in response to a single image pixel value). In other embodiments, each cluster 50 can receive more than one image pixels, for example a cluster 50 can receive a two-by-two array of image pixels and drive a four-by-four array of display pixels 20 or an eight-by-eight array of display pixels 20.

According to some embodiments, each cluster 50 computes interpolated data 62 for display pixels 20 in cluster 50 without exchanging image pixel information with neighboring clusters 50. However, according to embodiments of the present disclosure, images are processed and analyzed externally to clusters 50 (e.g., in display controller 80) to discover local image attributes for each image pixel associated with a cluster 50. The local image attributes for each image pixel can be found by using pattern matching, pattern recognition, machine learning, or artificial intelligence to match an array of image pixels including the image pixel with a predefined set of local image attributes. The local image attributes can be encoded as parameters in a multi-bit parameter value associated with the local image attributes and communicated to each cluster 50 with the associated image pixel for that cluster 50. According to embodiments of the present disclosure, each cluster 50 computes interpolated data 62 values in response to the provided image pixel (input data 60) and parameters. The interpolated data 62 values are displayed by one or more of display pixels 20 in cluster 50 and the resulting displayed image has an appearance that is apparently sharper or otherwise has an appearance that is relatively improved in comparison to the original input image. As long as the parameter values communicated with the image pixel to each cluster 50 has fewer bits than the displayed image, the communication bandwidth for interpolated flat-panel display 90 is reduced. For example, an image pixel for one display pixel 20 can comprise three eight-bit values or 24 bits, one for each color in a full-color display. If cluster 50 controls four display pixels 20, the displayed image will have twelve eight-bit values or 96 bits. If some, but fewer than all, of the difference in bits (96−24=72 bits) between a conventional display and embodiments of the present disclosure are used for parameters to assist in computing the interpolated data 62, the bandwidth requirement for interpolated flat-panel displays 90 is reduced.

According to embodiments of the present disclosure, the image attributes can include texture, luminance, frequency, and color. Texture can include, but is not limited to, fur, glass, leaf, skin, sand, fabric, sky, grass, and woodgrain. The texture can be isotropic or anisotropic and can be directional. According to embodiments of the present disclosure, the image attributes local to cluster 50 can be described or encoded with a set of parameters, for example frequency, edge direction, magnitude, phase, and noise (for a two-dimensional image and display 90).

Figure 6:
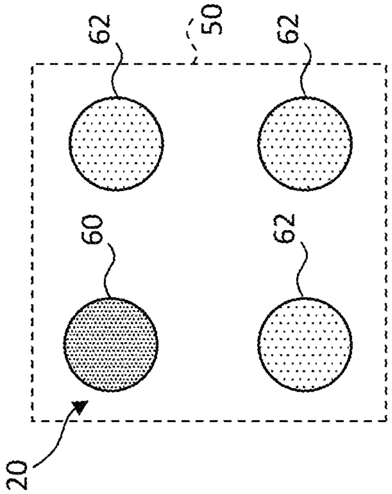
FIG. 6 is a diagram of input data and interpolated data applied to an array of display pixels in a cluster according to illustrative embodiments of the present disclosure.

According to embodiments of the present disclosure and as illustrated in FIG. 6, a cluster 50 comprises a two-by-two array of display pixels 20. In some embodiments, one of display pixels 20 is controlled by cluster controller 52 (with or without the assistance of pixel controller 22) to emit light corresponding to received input data 60 (an image pixel transmitted to cluster 50). Clusters 50 receive, in addition to input data 60, parameters (e.g., parameter values or cluster parameters) describing local image attributes of input data 60 and corresponding to cluster 50 display pixels 20. Cluster controller 52 then calculates interpolated data 62 corresponding to light emitted by the remaining display pixels 20 and applies interpolated data 62 to each corresponding display pixel 20 so that each display pixel 20 emits light corresponding to input data 60 or interpolated data 62 (illustrated by the circles in FIG. 6, for example).

For example, each of frequency, direction, magnitude, phase, and noise can be, but is not limited to, one-bit, two-bit, three-bit, or four-bit parameter values. In some embodiments, a single parameter value can be proved for each cluster 50. In some embodiments, different parameters can be provided for each color of light emitted by one or more display pixels 20 (e.g., red, green, blue), common parameters (e.g., the same parameter values) can be provided for all colors of light emitted by one or more display pixels 20, or one set of values can be provided for a single color of light emitted by one or more display pixels 20, for example green. In some embodiments of the present disclosure, display pixels 20 that receive interpolated data 62 emit monochrome light, for example green (e.g., as illustrated in FIGS. 3B-3E). Since the human visual system has greater acuity in response to green light and lower response to red and blue light, each of interpolated display pixels 20 can emit only one color of light, for example green, and only display pixels 20 that emit input data 60 emit full-color light. Some such embodiments, therefore, are less expensive to construct, require less power to operate, and require simpler cluster controllers 52.

According to embodiments of the present disclosure, parameter values can have different numbers of bits, for example eight bits, seven bits, six bits, or five bits. In general, greater numbers of bits in the parameter values enable better interpolated data 62. For simplicity of illustration, the parameters in the following examples have eight bits, but embodiments of the present disclosure can have fewer or more than eight bits. If a single eight-bit parameter value is used for each cluster 50, then if three eight-bit values are also used for a single input data 60 value for a four-by-four display pixel 20 cluster 50, the image and parameter data communicated to each cluster 50 for a cluster will have 32 bits (24 bits+8 bits). Thus, in this example, the bandwidth will be reduced to 33.33% (32/96) of a conventional display (e.g., one third). If each cluster 50 controls a four-by-four display pixel 20 array a conventional display will transmit 384 bits and embodiments of the present disclosure will reduce the bandwidth to 8.33% (32/384) of a conventional display (e.g., one twelfth). If fewer bits are used in the parameter values, the additional bandwidth reduction can be 0.5% to 2% (e.g., with six bits) or 0.8% to 3% (e.g., with five bits). If separate parameter values are sent for each color channel, the bandwidth savings are reduced, for example an eight-bit parameter for each color adds 24 bits so that bandwidth reduction is one half (50%=48/96) for clusters 50 controlling 4 display pixels 20 and one eighth (12.5%=48/384) for clusters 50 with sixteen display pixels 20 of the bandwidth needed for a conventional display. The number of parameter bits used for each color channel need not, but can be, the same. In some embodiments, the number of parameter bits used for the red and blue color channels is less than the number of parameter bits used for the green channel, as green carries more spatial information. The use and meaning of parameter bits in red and blue color channels can also be different from the use or meaning of parameter bits for the green channel (e.g., different image attributes are encoded in the parameter value).

Figure 5B:
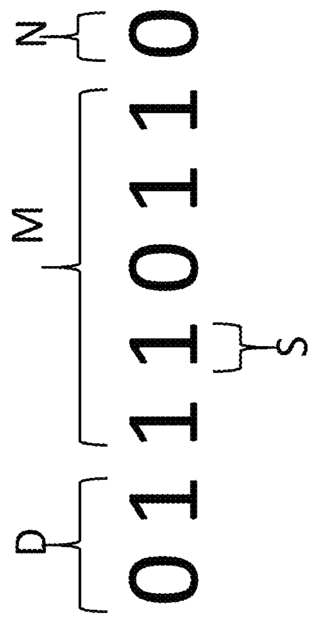
FIGS. 5A-5C each represent bits in a parameter value according to illustrative embodiments of the present disclosure.
Figure 5A:
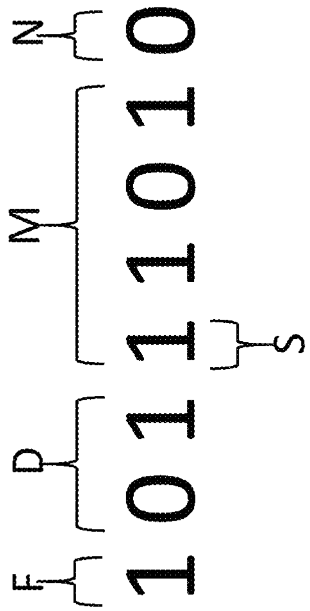

According to embodiments of the present disclosure, parameter values can have different numbers of bits assigned to different attributes of local display pixels 20 or specifying attributes of desired interpolated data 62. For example, as shown in FIG. 5A, in some embodiments a single bit specifies frequency F, two bits specify edge direction D, four bits specify magnitude M, and one bit specifies noise N. In another embodiment shown in FIG. 5B, no bits are specified for frequency (but the 0 value of magnitude can indicate a zero frequency, e.g., replication of input data 60), that two bits specify edge direction D, five bits specify magnitude M, and one bit specifies noise N. In another embodiment shown in FIG. 5C, two bits specify a combined frequency and noise attribute FN, two bits specify edge direction D, and four bits specify magnitude M. In any case, one of the bits specifying magnitude can specify increasing or decreasing magnitude (sign bit S) and the remainder specify a relative magnitude change over display pixels 20 in clusters 50.

Figure 7A:
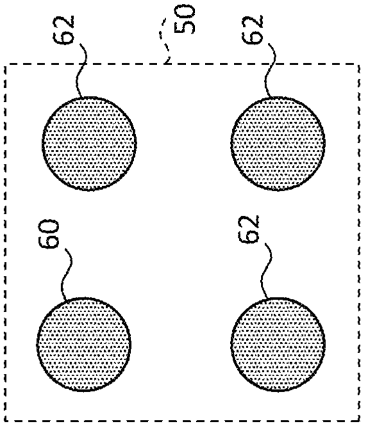
FIGS. 7A-7E are diagrams of input data and interpolated data applied to a two-by-two array of display pixels in a cluster in response to a provided parameter value according to illustrative embodiments of the present disclosure.
Figure 7B:
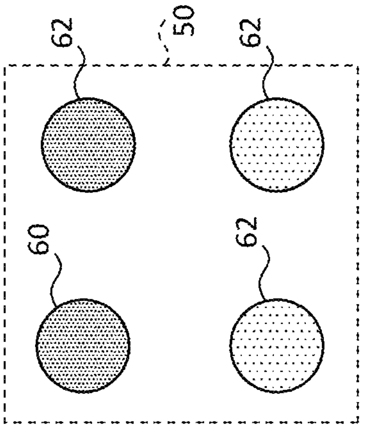
Figure 7C:
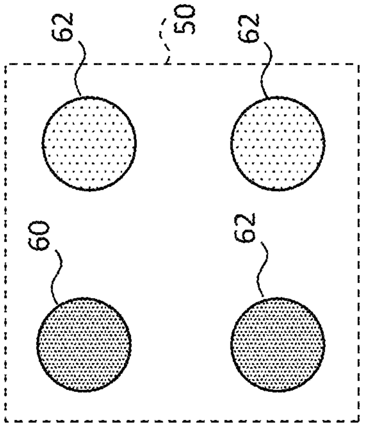
Figure 7D:
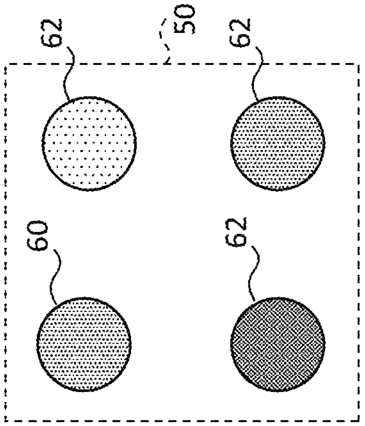
Figure 7E:
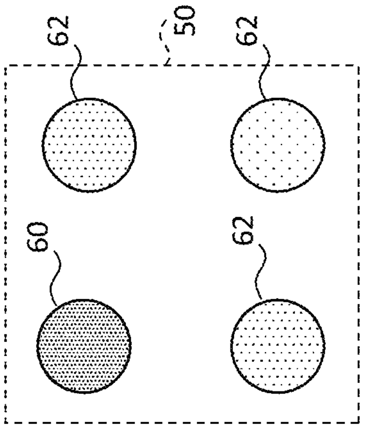
Figure 7F:
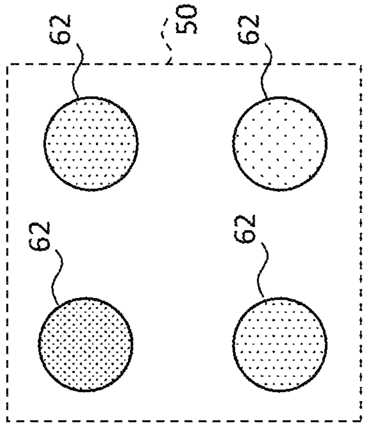
FIG. 7F is a diagram of interpolated data applied to a two-by-two array of display pixels in a cluster in response to a provided parameter value according to illustrative embodiments of the present disclosure.

For example, if a one-bit frequency value is set at zero, interpolated data 62 can be identical to input data 60, as illustrated in FIG. 7A. (FIGS. 7A-7E use light and dark circles similar to FIG. 6 to illustrate source and interpolated data 60, 62. Lighter circles indicate smaller data values and darker circles indicate larger data values. FIG. 7F shows an example where interpolated data 62 is used for all pixels.) This parameter setting reduces power since little computation is required and is suitable if input data 60 is at an edge in the image. A neighboring cluster 50 with a similar frequency value of zero but a different image pixel value that likewise replicates input data 60 to interpolated data 62 will provide a sharp spatial transition between clusters 50 and display pixels 20. This parameter can also be used if no interpolation is desired to reduce power, for example if a viewer is not viewing that portion of the image on display 90 (e.g., in response to eye-tracking).

Edge direction D can be specified as a two-bit parameter indicating one of four directions, zero for a horizontal direction, one for a vertical direction, two for a diagonal direction with a positive slope, and three for a diagonal direction with a negative slope. Each direction can correspond to a gradient of a desired magnitude M in the input image and the result is shown in FIG. 7B for a horizontal edge, FIG. 7C for a vertical edge, FIG. 7D for a diagonal edge with positive slope, and FIG. 7E for a diagonal edge with negative slope, for values of decreasing magnitude (S=0). Magnitude M of interpolated data 62 is shown with the lighter (for smaller values) and darker (for larger values) and is derived from a magnitude parameter indicating a difference from the input data 60. The magnitude can be a default value (if no magnitude parameter M is provided) and can increase or decrease in response to sign bit S as a percentage of a predetermined range specified by magnitude parameter M. The number of bits associated with magnitude parameter M can be chosen to reflect the desired accuracy of interpolated data 62 compared to a more complex or sophisticated interpolation algorithm (e.g., determined externally to display 90, for example in display controller 80). In some embodiments, magnitude value M can be different from a notionally perfect value but can still improve the appearance of an edge in the displayed image.

In some embodiments, a single-bit noise parameter N can be used as one of the descriptive parameters. When set, interpolated data 62 can be set to random values (or pseudo-random values). The magnitude of the random values (e.g., magnitude of the difference from input data 60) can be specified from magnitude parameter M. The noise parameter calculation can also incorporate edge direction D information to control interpolated data 62 (e.g., noise supplied in an edge direction), or the bits used to specify direction can be allocated to other purposes, such as more bits specifying magnitude M or providing the base of a pseudo-random number generator to calculate a noise value.

In some embodiments, parameter bits can be used to specify a specific value indicating a random series applied to generate interpolated data 62, for example repurposing the frequency and direction bits D (or using additional parameter bits). For example, if three bits are used as the base, eight different pseudo-random series can be generated and applied to generate interpolated data 62. If the value of the three bits themselves are randomly provided to each cluster 50, a reasonably visually random appearance can be provided. In some embodiments, a pseudo-random series can be generated from an input signal, such as a row-select or column-data signal (or other signal such as a clock signal or noise purposely provided on a power or ground line). Since time is required for signals to propagate different distances over display substrate 10), starting a pseudo-random number generator at a specific signal transition will result in different pseudo-random numbers in different clusters 50 generated at a given time. In some embodiments, a locally different value can be determined from an attribute of the cluster 50 physical environment, such as an electrostatic potential, local capacitance, local temperature, local ambient light intensity, local electromagnetic radiation, local reflectivity, touch state (for a touch screen overlaid on display 90), electrical environment (electrical noise on a signal, power, or ground line), or local electromagnetic noise. Since the local value of each attribute in each cluster 50 can be different (as clusters 50 are at different locations over display substrate 10, local conditions can be different, and the measured value can likewise differ).

Figure 16:
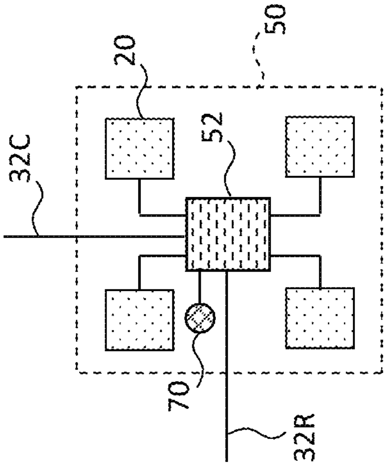
FIG. 16 is a schematic diagram of a cluster comprising four pixels and a cluster sensor according to illustrative embodiments of the present disclosure.

In some embodiments of the present disclosure and as illustrated in FIG. 16, cluster controller 52 is operable to measure an attribute of the cluster 50 local environment and calculate interpolated data 62 responsive to the measured attribute. The measured attribute can be, for example, a base for a pseudo-random series used to provide noise to interpolated data 62. Cluster 50 can comprise a cluster sensor 70 disposed within cluster controller 52 or on display substrate 10 and under the control of cluster controller 52. Cluster sensor 70 can be responsive to a desired attribute of the cluster's local environment. The attribute of the cluster 50 local environment can be one or more of an electrostatic potential, local capacitance, local temperature, local ambient light intensity, local electromagnetic radiation, and local reflectivity.

Figure 8B:
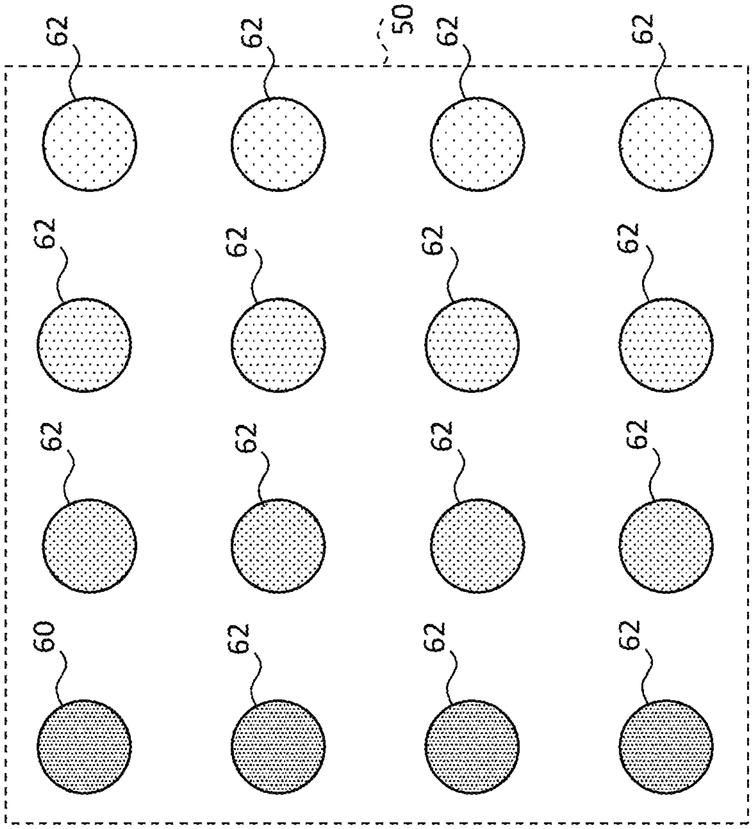
FIG. 8A is a parameter value according to illustrative embodiments of the present disclosure and FIG. 8B is a diagram of input data and interpolated data applied to an array of display pixels in a cluster in response to the parameters of FIG. 8A according to illustrative embodiments of the present disclosure.
Figure 8A:
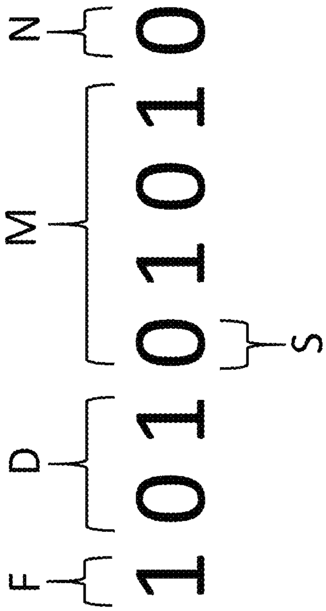

In a larger cluster 50 (e.g., comprising a four-by-four array of display pixels 20), more interpolated data 62 can be calculated for display pixels 20 in the larger array. For example, FIG. 8A illustrates a parameter value in which F (frequency) is set to one so that interpolated data 62 is not simply replicated from input data 60 (e.g., as shown in FIG. 7A), D (edge direction) is set to one corresponding to a vertical edge (e.g., as shown in FIG. 7C), M (magnitude) is set to binary 5, and N (noise) is set to zero (off). The result is shown in FIG. 8B where the first bit of M (zero) indicates decreasing edge pixel values and the remaining bits (binary 5) specify the magnitude of the decrease in interpolated data 62 for display pixels 20.

Figure 9B:
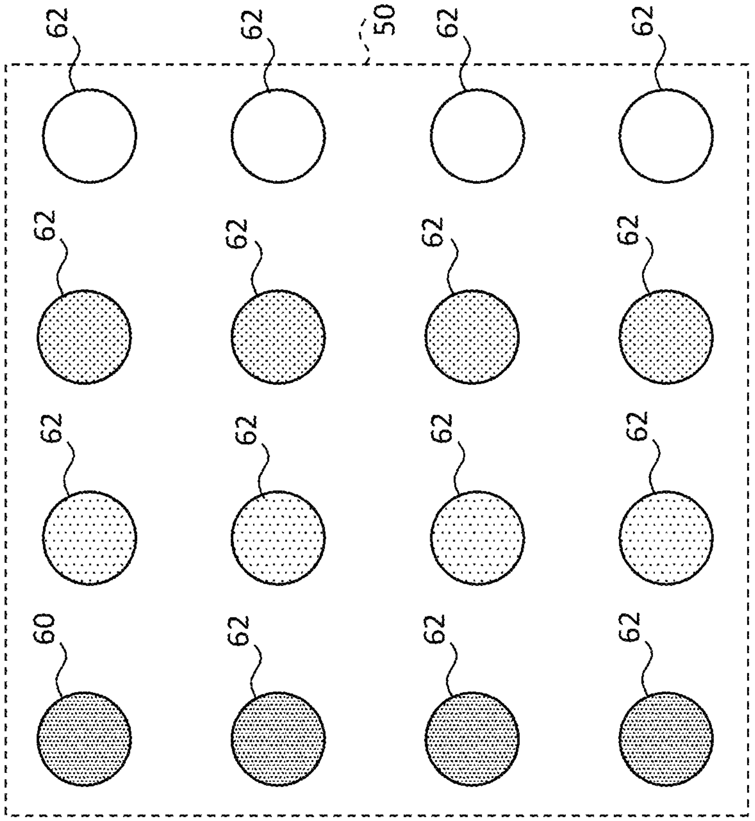
FIG. 9A is a parameter value according to illustrative embodiments of the present disclosure and FIG. 9B is a diagram of input data and interpolated data applied to an array of display pixels in a cluster in response to the parameters of FIG. 9A according to illustrative embodiments of the present disclosure.
Figure 9A:
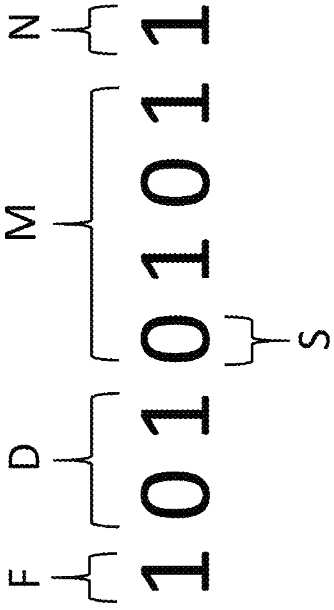

FIGS. 9A and 9B illustrate an embodiment in which the noise parameter (N) is set. In this example, the direction is set to a vertical edge, F is set to one to determine a pseudo-random series, the sign S of the magnitude M value indicates that the noise values decrease in magnitude, and the remaining magnitude bits specify the range of the noise values. In other embodiments, more parameter values (or fewer, for example fewer magnitude bits M) can be provided.

Figure 5C:
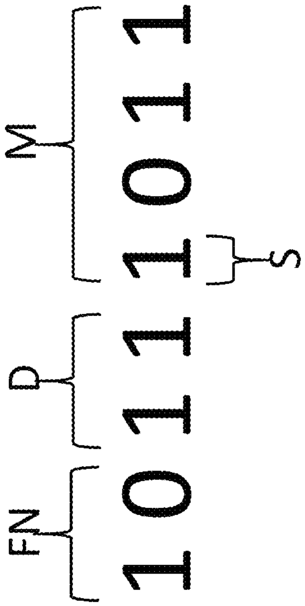
Figure 10B:
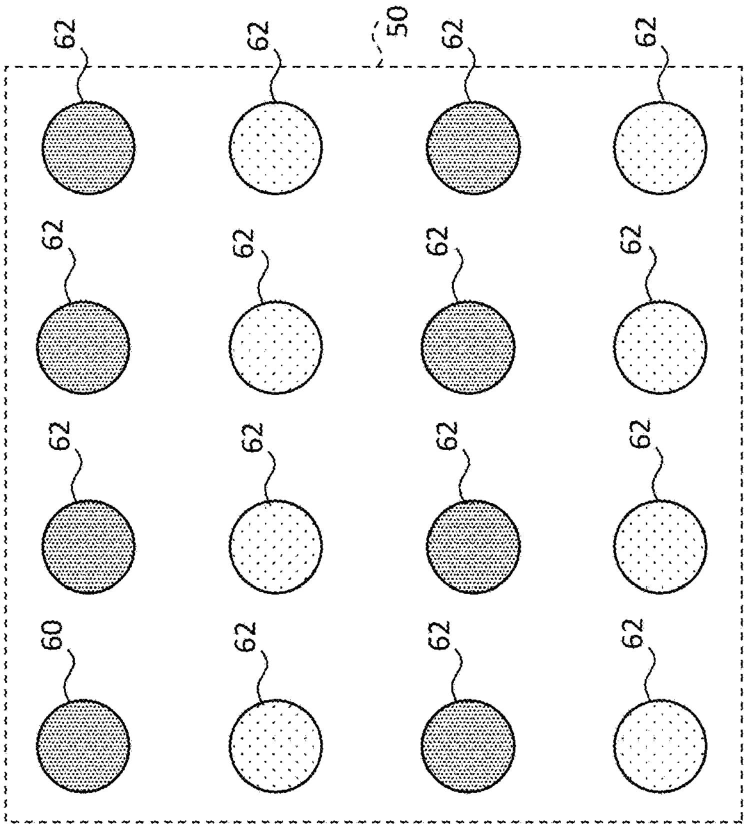
FIGS. 10A-10D are diagrams of input data and interpolated data applied to a four-by-four array of display pixels in a cluster in response to provided parameters according to illustrative embodiments of the present disclosure.
Figure 10A:
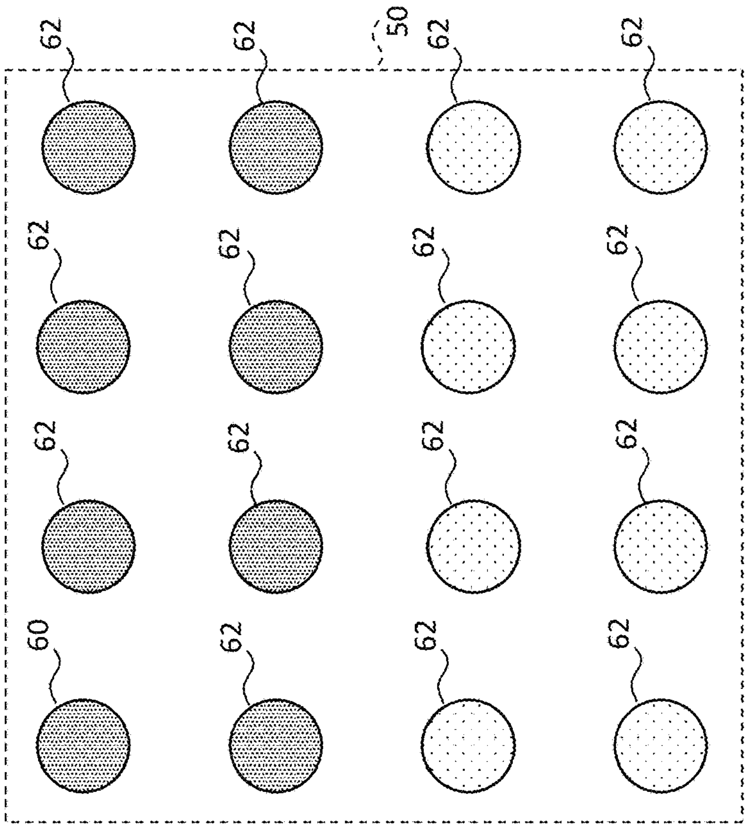
Figure 10D:
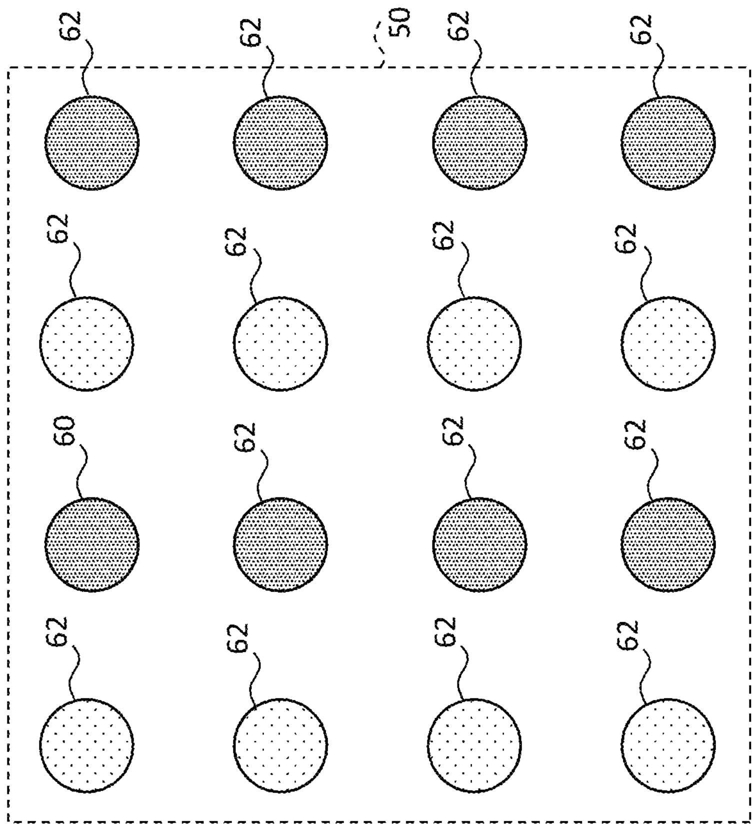
Figure 10C:
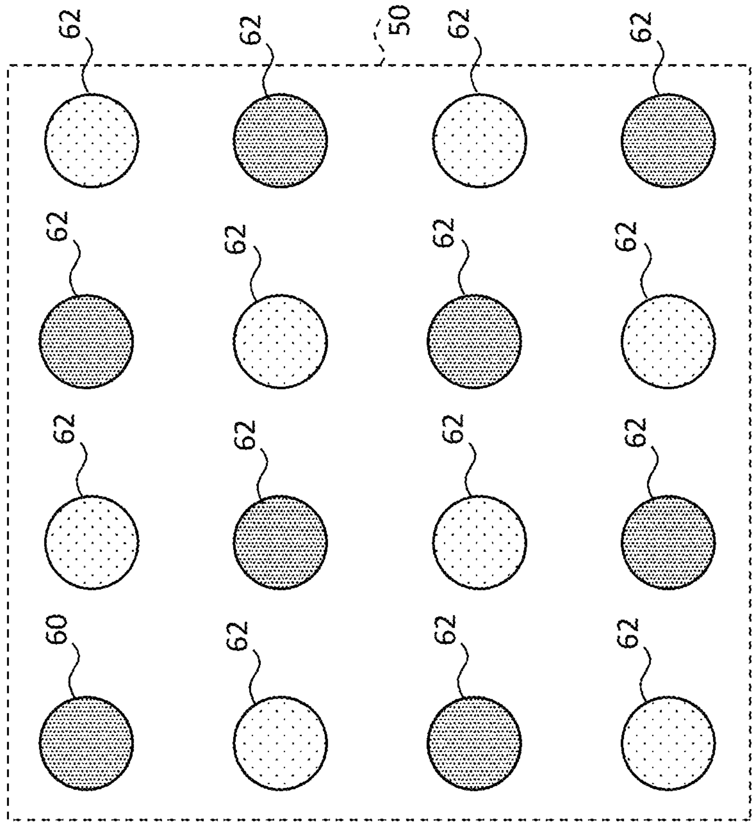

In some embodiments, two frequency bits F are used, for example where clusters 50 comprise a four-by-four array of display pixels 20. A zero value can indicate pixel replication (as in FIG. 7A), a one can indicate two lines of input data 60 followed by two lines of interpolated data 62 as shown in FIG. 10A for a horizontal edge direction (or three rows each for a diagonal edge direction), a binary two can indicate alternating lines of input data 60 and interpolated data 62, as shown in FIG. 10B for a horizontal edge and FIG. 10C for a negative slope diagonal edge. A three value can indicate a noise interpolation (so that the N bit is not necessary, as shown in FIG. 5C). FIG. 10D illustrates an embodiment in which a phase value is included in the parameter and indicates a position of the input data 60 within the display pixel 20 array of each cluster 50, in this example for a vertical edge. The phase value can specify phase in one or two dimensions and can employ one or more bits in the parameter value.

In some embodiments, clusters 50 receive multiple input data 60 image pixel values. A common parameter set can be used for each input data 60 image pixel value, or a different parameter set can be provided for each input data 60 pixel value. A subset of display pixels 20 can be associated with each input data 60 value. For example, if a two-by-two array of input data 60 values is provided to a cluster 50 that controls a four-by-four array of display pixels 20, each input data 60 value can be used to specify interpolated data 62 for a two-by-two array of display pixels 20 in cluster 50 and spatially associated with a corresponding input data 60 image pixel value. If clusters 50 control an eight-by-eight array of 64 display pixels 20, then each input data 60 value can be associated with a four-by-four display pixel 20 subset of the eight-by-eight array of 64 display pixels 20.

Because the magnitude can be defined as a relative difference from input data 60 in a cluster 50 (rather than as an absolute value), embodiments of the present disclosure can accommodate a wide variety of images and image pixel values in different colors and provide a reasonable and visually pleasing interpolated (upscaled) image on an interpolated flat-panel display 90 provided with an input image having fewer image pixels than display pixels 20 in interpolated flat-panel display 90, thereby reducing bandwidth requirements and communication power for interpolated flat-panel display 90. In particular, different interpolated color sub-pixel values (e.g., red, green, and blue) automatically adjust to their particular input data 60 value, so that a single interpolated data 62 for cluster 50 is adjusted for each color sub-pixel in display pixels 20 of cluster 50. The same algorithm can be applied to each color sub-pixel or different algorithms can be provided for one or more sub-pixels or each color sub-pixel. In some embodiments, interpolated data 62 is computed for only a green sub-pixel (so that red and blue interpolated data 62 are replicated from input data 60) or display pixels 20 with interpolated data 62 comprise only a green sub-pixel (e.g., as illustrated in FIG. 3B).

According to some embodiments of the present disclosure, the parameter value is exclusively one or more magnitude values, with or without a sign bit. In some embodiments, the parameter value comprises a magnitude value for each color channel, for example red, green, and blue color channels, with or without a sign bit. If the parameter value encodes multiple magnitude values, e.g., one for each color channel, the number of bits allocated to each of the channels can be the same, or different. For example a green color channel can have more allocated bits in the parameter value than a red or blue color channel.

In some embodiments, the number of bits in the parameter value is a multiple of three, for example, nine, twelve, fifteen, eighteen, twenty-one, twenty-four, twenty-seven, or thirty bits. For example, the parameter value can have twelve bits, with four bits allocated to each of three color channels. For example, the parameter value can have twelve bits, with six bits allocated to a green color channel (e.g., to interpolate green sub-pixels in pixels 20 in a cluster 50) and four bits allocated to each of the red and blue color channels (e.g., to interpolate red and blue sub-pixels in pixels 20 in a cluster 50). In another example, the parameter value can have eighteen bits, eight bits allocated to a green color channel (e.g., to interpolate data 62 for green sub-pixels in pixels 20 in a cluster 50) and six bits allocated to each of the red and blue color channels.

In some embodiments, the magnitude can be the difference between the input data of a cluster 50 and the input data of a neighboring cluster 50, or the average of neighboring clusters 50 (for example provided by the display controller 80). In another embodiment, the magnitude can be the actual interpolated data 62 required for a cluster 50 (for example computed by the display controller 80). The magnitude value for a channel can comprise two or three values, one for a pixel 20 in each of two or three directions (e.g., horizontal, vertical, and diagonal).

For example, where the input data for a green channel for a cluster 50 is 100, the input data for a pixel 50 in a cluster 50 to the right is 120 (a difference of +20), the input data for a pixel 20 in a cluster 50 below is 90 (a difference of −10), the parameter can have a value of 110100001010 (where each parameter is six bits and the first bit is a sign, the parameter equals +20, −10 with six bits of twelve bits allocated to each of the two green sub-pixels of interpolated pixels 20). The pixel 20 to the bottom right (e.g., on the diagonal) can be interpolated from these values (for example an average=+5).

In some embodiments, an actual value for the interpolated data 62 of each interpolated pixel 20 can be provided in the parameter, for example using a twelve bit parameter to represent four, four-bit values. In some embodiments, the magnitude value is encoded, so that each bit represents a difference greater than one bit in the interpolated data 62, for example a factor of two or four, thus increasing the dynamic range of the interpolated value (at the expense of detail). Since a difference of a single bit is often indistinguishable to an observer, depending on the input image content, a multiplicative factor of four in the example above will provide a magnitude difference of 124 (=31×4) in both the positive and negative directions. For an eight-bit image pixel value, such an encoding can meet most needs of most images. If a different number of bits are used to represent the magnitude of the green colors than red or blue color channels, the encoding factor can be likewise greater. For example a green coding factor can be four (with a five-bit magnitude value) and a red or blue coding factor can be eight (with a four-bit magnitude value) providing a positive and negative value range for the red and blue channels of 120 (15×8).

Since most large images vary relatively slowly between pixels, encoding the parameter as one or more magnitude values in one or more color channels and in one or more dimensions can provide good results with little computation necessary in cluster controller 52, reducing the circuitry required and the power used by cluster controller 52. Using actual interpolated data 62 provided externally to clusters 50 (e.g., provided by display controller 80) or actual input data from neighboring clusters 50 can provide a simple interpolation method that is especially useful where the number of pixels 20 in a cluster 50 are relatively small, for example a four-by-four pixel array in a cluster 50.

An interpolated data 62 value can be a replicated value (e.g., of input data 60) or can be extracted from the parameter value without further processing or calculation.

Figure 17:
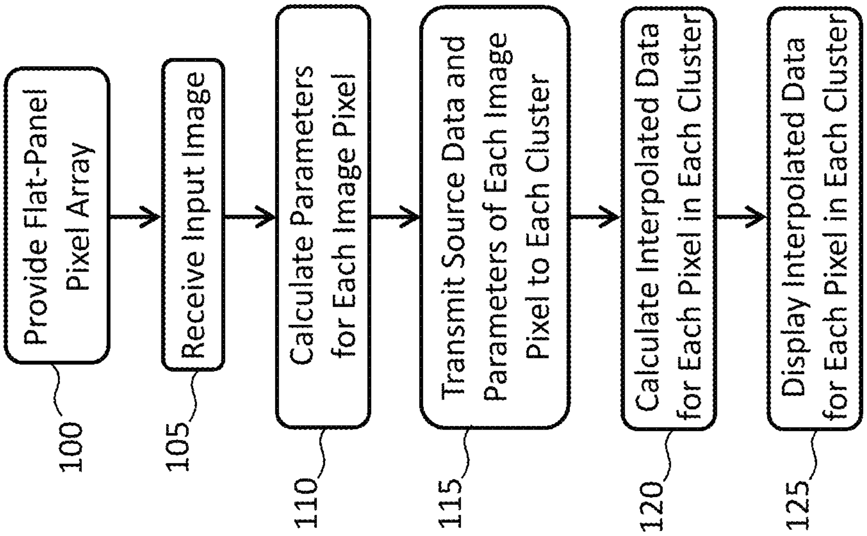
FIG. 17 is a flow diagram according to illustrative embodiments of the present disclosure.

According to embodiments of the present disclosure and as illustrated in the flow diagram of FIG. 17, an interpolated flat-panel display 90 provided in step 100 having a number of display pixels 20 operates by first receiving an input image in step 105 where each image pixel in the input image array comprises one or more data values (input data 60) corresponding to one or more colors in the image pixel. The input image comprises a first number of image pixels arranged in rows and columns corresponding to clusters 50 in interpolated flat-panel display 90. The number of image pixels in the input image is less than the number of physical display pixels 20 in interpolated flat-panel display 90 (e.g., one half, one quarter, one eighth, or one sixteenth). The input image is processed in step 110, for example by a display controller 80, to calculate parameter values having a desired number of bits for each image pixel that specifies image attributes local to the image pixel in the input image. Each image pixel and associated parameter value is transmitted in step 115 to a cluster 50 in a row and column of the interpolated flat-panel display 90 associated with the image pixel, for example using active-matrix row-select signals transmitted on row wires 32R and column-data signals transmitted on column wires 32C. Each cluster 50 in array 12 receives the image pixel and parameter values associated with the cluster 50 and, responsive to the image pixel and parameter value, calculates interpolated data 62 for cluster 50 in step 120, and controls display pixels 20 in cluster 50 in step 125 to emit light corresponding to input data 60 and interpolated data 62, thus displaying an upscaled (interpolated) version of the input image on interpolated flat-panel display 90.

According to embodiments of the present disclosure, display controller 80 (or other external computer or controller) can generate or identify predefined textures in a local image pixel group designed to represent common image textures, including fur or hair, glass, plant tissues, skin, sand, water, fabric, woodgrain, and others. Attributes of the identified textures can be encoded in a parameter value and communicated to clusters 50 in display 90. The textures can be isotropic (e.g., have a direction) or anisotropic (e.g., have a non-direction texture). Textures can have hue invariance, a spatial hue or luminance transitions based on color data from neighboring input image pixels and such attributes can be encoded in the parameter value transmitted to each cluster 50. In some embodiments, cluster controller 52 generates, looks up, or receives pseudo-random values representing variable magnitude (amplitude or luminance of light emitted or color variation by display pixels 20), for example defined by pixel controller 80 input image analysis of input image pixels, encodes the values in the transmitted parameters used by cluster controller 52 to generate interpolated data 62, and applies them to display pixels 20.

Figure 11:
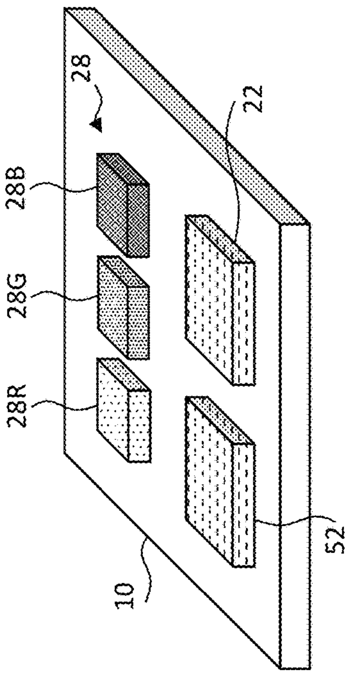
FIGS. 11-14 are perspectives of various integrated circuits and substrates according to illustrative embodiments of the present disclosure.
Figure 12:
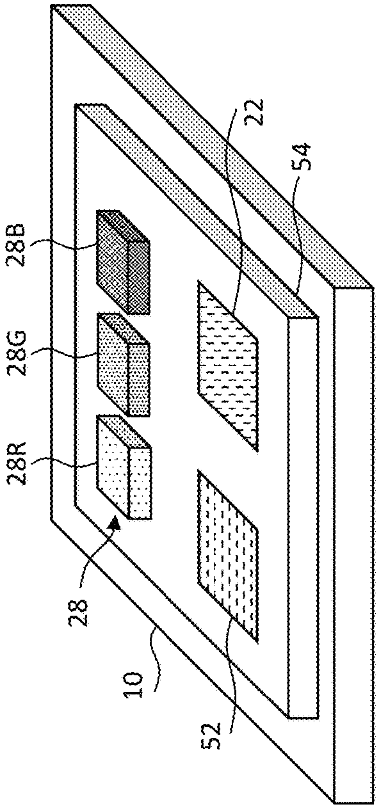
Figure 13:
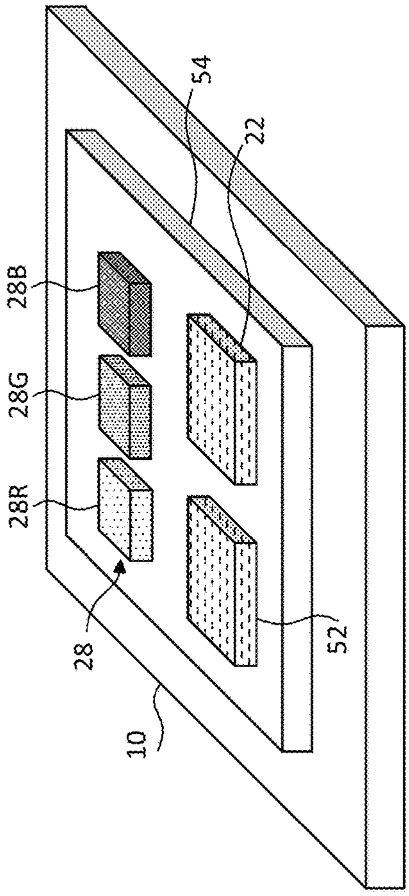

Cluster controllers 52 and pixel controllers 22 can comprise one or more integrated circuits, for example CMOS or mixed signal integrated circuits formed in a silicon substrate using photolithographic methods and materials. Cluster controllers 52 and pixel controllers 22 can comprise digital circuits that provide one or more of input, output, computation, and control functions using digital logic, for example comprising a stored-program machine executing firmware or a state machine. In some embodiments, a cluster controller 52 or pixel controller 22 is a microcontroller having instructions stored thereon that are executable to control pixels 20. Any one or more of cluster controllers 52, pixel controllers 22 (if present), and light emitters 28 can be bare die micro-transfer printed from a source wafer to display substrate 10 as illustrated in FIG. 11. In some embodiments, cluster controllers 52 and pixel controllers 22 (if present) are formed in and native to a cluster substrate 54 (e.g., a silicon substrate) on which is mounted light emitters 28, e.g., by micro-transfer printing. Cluster substrates 54 can be mounted on display substrate 10, as shown in FIG. 12. In some embodiments, either or both of cluster controllers 52 and pixel controllers 22 (if present) are disposed on and non-native to cluster substrate 54 (e.g., by micro-transfer printing), as shown in FIG. 13.

Figure 14:
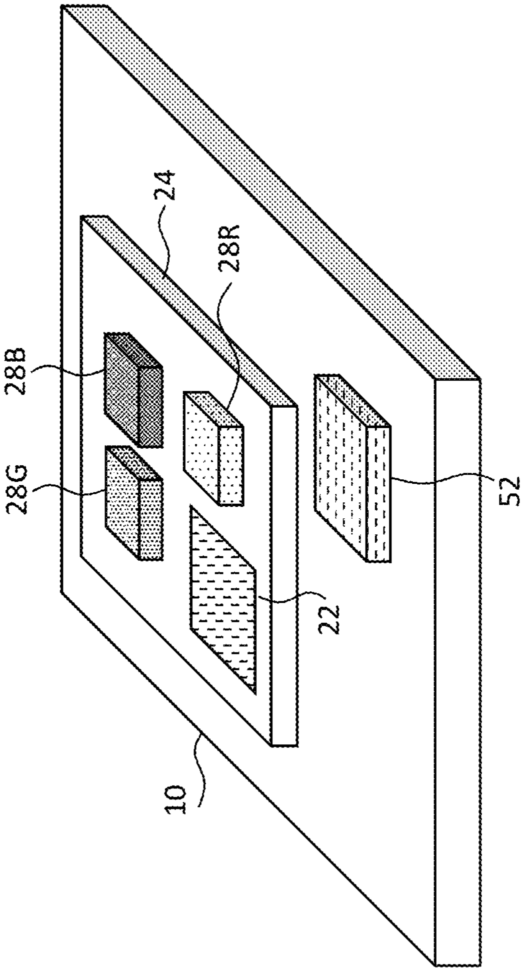

Some embodiments of the present disclosure comprise a pixel substrate 24 on which is disposed light emitters 28 (e.g., by micro-transfer printing) and pixel controller 22 (if present). Pixel controller 22 can be native to pixel substrate 24 (e.g., formed and patterned on pixel substrate 24, such as a silicon substrate), as shown in FIG. 14, or can be non-native to and transfer printed onto pixel substrate 24 (e.g., by micro-transfer printing, not shown in the Figures). Such pixel substrates 24 or cluster substrates 54 can enable testing of a display pixel 20 or cluster 50 before mounting pixel substrate 24 or cluster substrate 54 onto display substrate 10, thus improving yields.

Row controllers 30R and column controllers 30C can comprise one or more integrated circuits, for example CMOS or mixed signal integrated circuits, can be disposed on display substrate 10, and can be a part of display controller 80. Light emitters 28 can be inorganic light-emitting diodes (LEDs) disposed on pixel substrate 24, cluster substrate 54, or display substrate 10. Such light emitters 28 can comprise compound semiconductor materials selected to emit light of the desired wavelength. Because inorganic LED light emitters 28 can be very small (e.g., 8-by-15 microns) and occupy relatively little space on or over display substrate 10, cluster controllers 52 (and pixel controllers 22) can be disposed on display substrate 10 and still provide a display 90 with a large number of display pixels 20 spaced relatively close together providing a high-resolution display, e.g., a large-format high-resolution display for example with a display substrate 10 having a length or width of 0.5 meters, 1.0 meters, 1.5 meters, 2.0 meters or larger.

Figure 15:
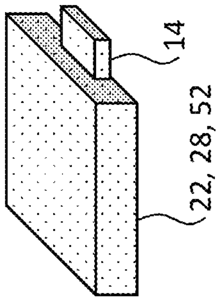
FIG. 15 is a perspective of a micro-transfer printed device with a tether according to illustrative embodiments of the present disclosure.

As shown in FIG. 15, micro-transfer printed devices (e.g., pixel controller 22 if present, light emitters 28, and cluster controllers 52) can have a fractured or separated tether 14 as a consequence of micro-transfer printing and can have a length or width (or both) less than 200, 100, 50, 40, 30, 20, or 10 microns and a thickness of 5-20 microns, 10-15 microns, or less than 50, 100, or 200 microns.

The various integrated circuits can be small, unpackaged integrated circuits such as unpackaged dies interconnected with wires connected to contact pads on the integrated circuits, for example formed using photolithographic methods and materials. In some embodiments, the integrated circuits are made in or on a semiconductor wafer and have a semiconductor substrate. In some embodiments, a cluster substrate 54 or a pixel substrate 24 is a semiconductor substrate and one or more of cluster controller 52 and pixel controller 22 (if present) are formed on and native to the semiconductor wafer. Semiconductor materials (for example doped or undoped silicon, GaAs, or GaN) and processes for making small integrated circuits are well known in the integrated circuit arts. Likewise, backplane substrates and means for interconnecting integrated circuit elements on the backplane are well known in the display and printed-circuit-board arts.

Clusters 50 or display pixels 20 can be cluster modules or pixel modules comprising multiple components (e.g., integrated circuits and light emitters 28) disposed on a cluster substrate 54 or pixel substrate 24, respectively, for example by micro-transfer printing, and can have fractured or separated tethers 14. Cluster controllers 52, pixel controllers 22, and light emitters 28 can be made in multiple integrated circuits that are non-native to display substrate 10, for example having separate, independent, and distinct substrates from display substrate 10 or from a cluster substrate 54 or pixel substrate 24. Cluster modules or pixel modules can be assembled onto display substrate 10, e.g., by micro-transfer printing from a cluster source wafer or pixel source wafer. Pixel modules can be assembled onto cluster substrate 54 e.g., by micro-transfer printing from a pixel source wafer.

Display substrate 10 (or a cluster substrate 54 or a pixel substrate 24) can be any useful substrate on which clusters 50, display pixels 20, row wires 32R, and column wires 32C can be suitably disposed, for example display substrate 10, cluster substrate 54, or pixel substrate 24 can include polymer, plastic, resin, polyimide, PEN, PET, metal, metal foil, glass, fiberglass, a semiconductor, ceramic, quartz, sapphire, or other substrates found in the display or integrated circuit industries. In some embodiments of the present disclosure, light emitters 28 emit light through display substrate 10, cluster substrate 54, or pixel substrate 24 and through display substrate 10, cluster substrate 54, or pixel substrate 24 can have a transparency greater than or equal to 50%, 80%, 90%, or 95% for visible light or light emitted by light emitters 28. In some embodiments, light emitters 28 emit light in a direction opposite display substrate 10, cluster substrate 54, or pixel substrate 24.

Display substrate 10 can be flexible or rigid and can be substantially flat. Column wires 32C and row wires 32R can be wires (e.g., photolithographically defined electrical conductors such as metal lines) disposed on display substrate 10 that conduct electrical signals from a display controller 80 or from column controller 30C through column wires 32C to clusters 50 and from row controller 30R through row wires 32R to clusters 50). Display substrate 10 usefully has two opposing smooth sides suitable for material deposition, photolithographic processing, or micro-transfer printing of cluster controllers 52, pixel controllers 22, or light emitters 28. Display substrate 10 can have a size of a conventional display, for example a large-format rectangular display 90 with a diagonal up to one or more meters. Display substrate 10 can have a thickness from 5 to 10 microns, 10 to 50 microns, 50 to 100 microns, 100 to 200 microns, 200 to 500 microns, 500 microns to 0.5 mm, 0.5 to 1 mm, 1 mm to 5 mm, 5 mm to 10 mm, or 10 mm to 20 mm. According to embodiments of the present disclosure, display substrate 10 can include layers formed on an underlying structure or substrate, for example a rigid or flexible glass or plastic substrate.

In embodiments of the present disclosure, providing interpolated flat-panel display 90, display substrate 10, clusters 50, or display pixels 20 can include forming conductive wires (e.g., row wires 32R and column wires 32C) on display substrate 10, cluster substrate 54, or pixel substrate 24 by using photolithographic and substrate processing techniques, for example photolithographic processes employing metal or metal oxide deposition using one or more of evaporation or sputtering, curable resin coatings (e.g. SU8), positive or negative photo-resist coating, radiation (e.g. ultraviolet radiation) exposure through a patterned mask, and etching methods to form patterned metal structures, vias, insulating layers, and electrical interconnections. Inkjet and screen-printing deposition processes and materials can be used to form patterned conductors or other electrical elements. The electrical interconnections, or wires, can be fine interconnections, for example having a width of less than fifty microns, less than twenty microns, less than ten microns, less than five microns, less than two microns, or less than one micron. Such fine interconnections are useful for interconnecting micro-integrated circuits, for example as bare dies with contact pads and used with the cluster substrate 54 or pixel substrates 24. Alternatively, wires can include one or more crude lithography interconnections having a width from 2 μm to 2 mm, wherein each crude lithography interconnection electrically connects cluster or pixel modules to display substrate 10. According to various embodiments, interpolated flat-panel display 90 can include a variety of designs having a variety of resolutions, light emitter 28 sizes, and displays having a range of display substrate 10 areas.

Array 12 of clusters 50 can be a completely regular array of clusters 50 (and display pixels 20) (as shown in the Figures) or can have rows or columns that are offset from each other, so that rows or columns are not disposed in a straight line and can, for example, form a zigzag line (not shown in the Figures).

In some methods of the present disclosure, the integrated circuits are disposed on the display substrate 10 by micro transfer printing. In some methods, the integrated circuits (or portions thereof) or light emitters 28 are disposed on a cluster substrate 54 or pixel substrate 24 to form a heterogeneous module and the modules are disposed on display substrate 10 using compound micro-assembly structures and methods, for example as described in U.S. patent application Ser. No. 14/822,868 filed Aug. 10, 2015, entitled Compound Micro-Assembly Strategies and Devices. However, since modules can be larger than integrated circuits, in some methods of the present disclosure, the modules are disposed on display substrate 10 using pick-and-place methods found in the printed-circuit board industry, for example using vacuum grippers. The modules can be interconnected with display substrate 10 using photolithographic methods and materials or printed circuit board methods and materials.

In certain useful embodiments, display substrate 10 includes material, for example glass or plastic, different from a material in an integrated-circuit substrate, cluster substrate 54, or pixel substrate 24 which can be or include, for example, a semiconductor material such as silicon or GaN or GaAs. Light emitters 28 can be formed separately on separate semiconductor substrates, assembled onto the semiconductor substrates and then the assembled unit is located on the surface of display substrate 10. This arrangement has the advantage that the integrated circuits or pixel modules can be separately tested on the separate substrate and the modules accepted, repaired, or discarded before the module is located on display substrate 10, thus improving yields and reducing costs.

In some embodiments, the red, green, and blue micro-LEDs 28R, 28G, 28B (e.g., light emitters or micro-LEDs 28), cluster controllers 52, or pixel controllers 22 are micro transfer printed to pixel substrate 24, cluster substrate 54, or display substrate 10 in one or more transfers and can comprise broken (e.g., fractured) or separated tethers 14 as a consequence of micro-transfer printing. For a discussion of micro-transfer printing techniques see U.S. Pat. Nos. 8,722,458, 7,622,367 and 8,506,867, each of which is hereby incorporated by reference in their entirety. The transferred light emitters 28, cluster controllers 52, or pixel controllers 22 are then interconnected, for example with conductive wires using photolithographic methods and materials and optionally including connection pads and other electrical connection structures (e.g., connection posts), to enable a display controller (not shown in the Figures) to electrically interact with the light emitters 28 to emit light according to the present disclosure.

By employing a multi-step transfer or assembly process using cluster substrates 54 or pixel substrates 24, display pixel 20 or cluster 50 testing can be enabled, increased yields are achieved and thus reduced costs for interpolated flat-panel displays 90 of the present disclosure. Additional details useful in understanding and performing aspects of the present disclosure are described in U.S. patent application Ser. No. 14/743,981, filed Jun. 18, 2015, entitled Micro Assembled Micro LED Displays and Lighting Elements.

As is understood by those skilled in the art, the terms "over", "under", "above", "below", "beneath", and "on" are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer there between.

As is also understood by those skilled in the art, the terms "column" and "row", "horizontal" and "vertical", and "x" and "y" are arbitrary designations that can be interchanged so long as any relative reference is accordingly changed.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously.

Having described certain embodiments of displays and associated methods, it will now become apparent to one of skill in the art that other embodiments incorporating the concepts of the disclosure may be used. The disclosure has been described in detail with particular reference to certain embodiments thereof, but it will be understood that variations and modifications can be effected within the spirit and scope of the claimed invention.

PARTS LIST

F frequency
FN frequency/noise
D edge direction
M magnitude
N noise
10 display substrate
12 array
14 tether
20 display pixel/full-color display pixel
20G monochrome green display pixel
20W monochrome white display pixel
22 pixel controller
24 pixel substrate
28 light emitter/light-emitting diode (LED)/micro-LED
28R red light emitter/red light-emitting diode
28G green light emitter/green light-emitting diode
28B blue light emitter/blue light-emitting diode
28W white light emitter/white light-emitting diode
30R row controller/row driver
30C column controller/column driver
32R row-select line/row wire
32C column-data line/column wire
40R row of pixel clusters/cluster row
40C column of pixel clusters/cluster column
50 cluster of display pixels/pixel cluster
52 cluster controller
54 cluster substrate
70 cluster sensor
60 input data
62 interpolated data
80 display controller
90 interpolated flat-panel display/display
100 provide flat-panel display step
105 receive input image step
110 calculate parameters for each image pixel step
115 transmit input data and parameters of each image pixel to each cluster step
120 calculate interpolated data for each pixel in each cluster step
125 display interpolated data for each pixel in each cluster step

What is claimed:

1. An interpolated flat-panel display, comprising:

a display substrate;

an array of clusters disposed on the display substrate, each of the clusters comprising an exclusive group of display pixels and a cluster controller for exclusively controlling the display pixels, wherein the cluster controller is operable to:

(i) receive input data specifying a desired output from one or more but fewer than all of the display pixels in the group of display pixels, (ii) calculate additional interpolated data at least in part from the input data to specify a desired luminance value for one or more of the display pixels in the group for which input data is not received and provide an upscaled image with the interpolated data, and (iii) drive at least one of the one or more of the display pixels in the group of display pixels for which input data is not received to emit light in response to the interpolated data, wherein one or more of the display pixels comprise only one green sub-pixel or only one white sub-pixel, wherein the input data correspond to an image pixel in an input image and wherein the cluster controller is operable to receive a parameter value describing attributes of a local portion of the input image, including the image pixel, and the interpolated data is calculated at least in part from the parameter value, wherein the image attributes comprise texture or the parameter value specifies one or more of frequency, phase, and edge direction.

2. The interpolated flat-panel display of claim 1, wherein at least some of the display pixels are full-color pixels comprising red, green, and blue color channels and the cluster controller is operable to receive a parameter value for each color channel of the red, green, and blue color channels.

3. The interpolated flat-panel display of claim 2, wherein the parameter values are digital values having multiple bits and wherein the number of bits in the parameter values for red and blue is less than the number of bits in the parameter value for green.

4. The interpolated flat-panel display of claim 1, wherein the parameter value specifies exclusively one or more magnitude values.

5. The interpolated flat-panel display of claim 4, wherein the one or more magnitude values comprise a red magnitude value, a green magnitude value, and a blue magnitude value.

6. The interpolated flat-panel display of claim 5, wherein the green magnitude value comprises more bits of the parameter value than the red magnitude value or the blue magnitude value.

7. The interpolated flat-panel display of claim 4, wherein the one or more magnitude values comprise a single magnitude value representing a difference, two magnitude values each representing a difference in one of two directions, or three magnitude values each representing a difference in one of three directions.

8. The interpolated flat-panel display of claim 1, wherein, for each of the clusters, the display pixels in the cluster are arranged in a one-dimensional array.

9. The interpolated flat-panel display of claim 1, wherein, for each of the clusters, the display pixels in the cluster are arranged in a two-dimensional array.

10. The interpolated flat-panel display of claim 1, wherein each of the display pixels in each of the clusters comprises a pixel controller operable to individually control the pixel and each pixel controller in a cluster is controlled by the cluster controller for the cluster.

11. The interpolated flat-panel display of claim 1, wherein the clusters are disposed in cluster rows and cluster columns and the display pixels are disposed in pixel rows and pixel columns.

12. The interpolated flat-panel display of claim 11, wherein the number of cluster rows is less than the number of pixel rows, the number of cluster columns is less than the number of pixel columns, or both.

13. The interpolated flat-panel display of claim 1, wherein the cluster controller is operable to measure a local environmental attribute of the cluster and calculate interpolated data responsive to the measured local environmental attribute.

14. The interpolated flat-panel display of claim 13, comprising a cluster sensor disposed within the cluster controller or on the display substrate and under control of the cluster controller, the cluster sensor responsive to the local environmental attribute.

15. The interpolated flat-panel display of claim 14, wherein the local environmental attribute is one or more of: an electrostatic potential, local capacitance, local temperature, local ambient light intensity, local electromagnetic radiation, and local reflectivity.

16. The interpolated flat-panel display of claim 1, wherein the cluster controller is operable to drive each of the display pixels in the group of display pixels to emit light individually in response to the interpolated data or the input data.

17. The interpolated flat-panel display of claim 1, wherein the cluster controller is operable to drive at least one of the display pixels in the group of display pixels to emit light in response to the interpolated data and to drive at least one of the display pixels in the group of display pixels to emit light in response to the input data.

* * * * *